(12) United States Patent
Adamek et al.

(10) Patent No.: US 12,002,631 B2
(45) Date of Patent: Jun. 4, 2024

(54) ELECTRODEPOSITED DIELECTRIC FOR A SOLID ELECTROLYTIC CAPACITOR

(71) Applicant: KYOCERA AVX Components Corporation, Fountain Inn, SC (US)

(72) Inventors: Krystof Adamek, Ostrov (CZ); Pavel Koci, Ceska Trebova (CZ); Jan Petrzilek, Usti nad Orlici (CZ)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

(21) Appl. No.: 17/968,884

(22) Filed: Oct. 19, 2022

(65) Prior Publication Data

US 2023/0118528 A1    Apr. 20, 2023

Related U.S. Application Data

(60) Provisional application No. 63/257,631, filed on Oct. 20, 2021.

(51) Int. Cl.
| | | |
|---|---|---|
| *H01G 9/00* | (2006.01) | |
| *H01G 9/025* | (2006.01) | |
| *H01G 9/042* | (2006.01) | |
| *H01G 9/052* | (2006.01) | |
| *H01G 9/07* | (2006.01) | |

(52) U.S. Cl.
CPC ......... *H01G 9/0032* (2013.01); *H01G 9/0036* (2013.01); *H01G 9/025* (2013.01); *H01G 9/042* (2013.01); *H01G 9/052* (2013.01); *H01G 9/07* (2013.01)

(58) Field of Classification Search
None
See application file for complete search history.

(56) References Cited

U.S. PATENT DOCUMENTS

| | | |
|---|---|---|
| 4,945,452 A | 7/1990 | Sturmer et al. |
| 5,980,977 A * | 11/1999 | Deng ............... H01M 4/66 427/79 |
| 6,197,252 B1 | 3/2001 | Bishop et al. |
| 6,420,279 B1 | 7/2002 | Ono et al. |
| 6,473,293 B2 | 10/2002 | Shimada et al. |
| 6,551,873 B2 | 4/2003 | Park et al. |
| 6,731,495 B2 | 5/2004 | Kumar et al. |
| 6,987,663 B2 | 1/2006 | Merker et al. |
| 7,030,042 B2 | 4/2006 | Vaartstra et al. |
| 7,262,511 B2 | 8/2007 | Osako et al. |
| 7,350,281 B2 | 4/2008 | Schnetker |
| 7,379,290 B2 | 5/2008 | Toida et al. |
| 7,471,503 B2 | 12/2008 | Bruner et al. |
| 7,491,246 B2 | 2/2009 | Hossick-Schott et al. |
| 7,560,395 B2 | 7/2009 | Ahn et al. |
| 7,618,680 B2 | 11/2009 | Gleason et al. |
| 8,012,261 B2 | 9/2011 | Sneh |
| 8,125,768 B2 | 2/2012 | Horacek et al. |
| 8,313,538 B2 | 11/2012 | Merker et al. |
| 8,451,582 B2 | 5/2013 | Sneh et al. |
| 8,451,588 B2 | 5/2013 | Biler |
| 9,053,854 B2 | 6/2015 | Petrzilek et al. |
| 9,136,488 B2 | 9/2015 | Park et al. |
| 9,406,445 B2 | 8/2016 | Petrzilek et al. |
| 9,728,338 B2 | 8/2017 | Nagashima et al. |
| 10,087,541 B2 | 10/2018 | Romann et al. |
| 10,256,045 B2 | 4/2019 | Saeki et al. |
| 10,256,046 B2 | 4/2019 | Aoyama et al. |
| 10,431,389 B2 | 10/2019 | Petrzilek et al. |
| 10,737,101 B2 | 8/2020 | Petrzilek et al. |
| 10,861,652 B2 | 12/2020 | Chacko et al. |
| 11,049,664 B2 | 6/2021 | Petrzilek et al. |
| 11,056,285 B2 | 7/2021 | Petrzilek et al. |
| 11,081,288 B1 | 8/2021 | Aoki et al. |
| 11,139,117 B2 | 10/2021 | Weaver et al. |
| 11,183,339 B2 | 11/2021 | Petrzilek et al. |
| 11,380,492 B1 | 7/2022 | Kucharczyk et al. |
| 11,492,719 B2 * | 11/2022 | Ates .................. C25D 9/08 |
| 2001/0007167 A1 * | 7/2001 | Watanabe ........... H01G 9/0032 29/25.03 |
| 2005/0254199 A1 * | 11/2005 | Liu .................. H01G 9/0032 361/524 |
| 2008/0283409 A1 | 11/2008 | Chen et al. |

(Continued)

FOREIGN PATENT DOCUMENTS

| | | |
|---|---|---|
| CN | 102768902 A | 11/2012 |
| JP | 2005005134 A | 1/2005 |

(Continued)

OTHER PUBLICATIONS

Wood et al., "The mechanism of anodic oxidation of alloys", Journal of Applied Electrochemistry 1 (1971); pp. 189-206 (18 pages). (Year: 1971).*
Kalra et al., "Anodic Oxidation of Tantalum in Aqueous Electrolytes", Thin Solid Films, 177 (1989); pp. 35-47 (13 pages). (Year: 1989).*
Nahra et al., "Thin Tantalum Film Electrodeposition from an Ionic Liquid—Influence of Substrate Nature, Electrolyte Temperature and Electrochemical Parameters on Deposits' Quality", Journal of the Electrochemical Society, 168, 082501, (2021); 12 pages. (Year: 2021).*
Ban et al., "Formation and properties of Al2O3—ZrO2 composite anodic oxide film on etched aluminum foil by electrodeposition and anodization", J. Mater. Sci.: Mater. Electron., 27 (2016); pp. 1547-1552 (6 pages). (Year: 2016).*

(Continued)

*Primary Examiner* — Scott B Geyer

(74) *Attorney, Agent, or Firm* — Dority & Manning, P.A.

(57) ABSTRACT

A method for forming a solid electrolytic capacitor that includes an anode containing a valve metal composition, a dielectric overlying the anode, and a solid electrolyte overlying the dielectric is provided. The method comprises forming the dielectric by a process that includes placing the anode into contact with an electrolyte containing an ionic liquid and a valve metal salt and applying a potential difference between the anode and a counter electrode to form a dielectric oxide layer.

23 Claims, 1 Drawing Sheet

(56) References Cited

U.S. PATENT DOCUMENTS

| | | | |
|---|---|---|---|
| 2008/0285210 A1* | 11/2008 | Oh | H01G 9/0032 29/25.03 |
| 2009/0040690 A1 | 2/2009 | Yasuda | |
| 2011/0122546 A1 | 5/2011 | Nobuta et al. | |
| 2011/0230924 A1* | 9/2011 | Sherwood | H01G 9/035 29/25.42 |
| 2011/0310526 A1 | 12/2011 | Sneh et al. | |
| 2011/0310530 A1 | 12/2011 | Laor | |
| 2012/0200308 A1* | 8/2012 | Donne | H01G 11/42 205/333 |
| 2012/0261162 A1* | 10/2012 | Nakayama | H01G 9/042 148/285 |
| 2013/0224589 A1* | 8/2013 | Okamoto | H01M 4/661 428/606 |
| 2016/0104580 A1 | 4/2016 | Maeshima et al. | |
| 2021/0269931 A1* | 9/2021 | Bonometti | C25D 7/00 |
| 2022/0076895 A1 | 3/2022 | Petrzilek et al. | |
| 2022/0154360 A1* | 5/2022 | Wijenberg | C25D 17/10 |

FOREIGN PATENT DOCUMENTS

| | | |
|---|---|---|
| JP | 2005064352 A | 3/2005 |
| JP | 2008182098 A | 8/2008 |

OTHER PUBLICATIONS

Jang et al., "Preparation and characterization of Nb2O5—Al2O3 composite oxide formed by cathodic electroplating and anodizing", Materials Science and Engineering B 176 (2011); pp. 1505-1508 (4 pages). (Year: 2011).*

Sun et al., "Electrophoresis Deposition of TiO2 Nanoparticles on Etched Aluminum Foil for Enhanced Specific Capacitance", Electrochemical and Solid-State Letters 15 (1) (2012); pp. E1-E3 (3 pages). (Year: 2012).*

Atanasov et al., "Highly Conductive and Conformal Poly(3,4-ethylenedioxythiophene) (PEDOT) Thin Films via Oxidative Molecular Layer Deposition," *American Chemical Society, Chem. Mater.*, 2014, pp. A-H.

Paper—Mundy et al., "ALD Coatings of High Surface Area Carbons for Electrochemical Capacitors," *NC State University,* Center of Dielectrics and Piezoelectrics, www.che.ncsu.edu/losego, 20 pages, accessed prior to Apr. 13, 2018.

Paper—Oldham et al., "Introduction to Atomic and Molecular Layer Deposition: Application Toward Depositing Highly Conductive PEDOT Coatings by Vapor Phase Processing," *NC State University, Department of Chemical and Biomolecular Engineering,* Aug. 13, 2014, pp. 1-32.

Paper—Parsons et al., "Atomic/Molecular Layer Deposition and Prospects for Roll-to-Roll Processing," *NC State University, Department of Chemical and Biomolecular Engineering,* Jun. 18, 2015, 25 pages.

Paper—"How ALD Compares with Other Deposition Techniques," *Sundew Technologies, LLC,* 2 pages, accessed prior to Apr. 13, 2018.

Paper—"Selection of films grown by CVD, their applications and typical precursors used," *Overview of Chemical Vapour Deposition,* Chapter 1, pp. 23-26, accessed prior to Apr. 13, 2018.

Simunkova et al. "Tantalum-based nanotube arrays via porous-alumina-assisted electrodeposition from ionic liquid: Formation and electrical characterization", *Applied Surface Science,* 2021, 10 pages.

* cited by examiner

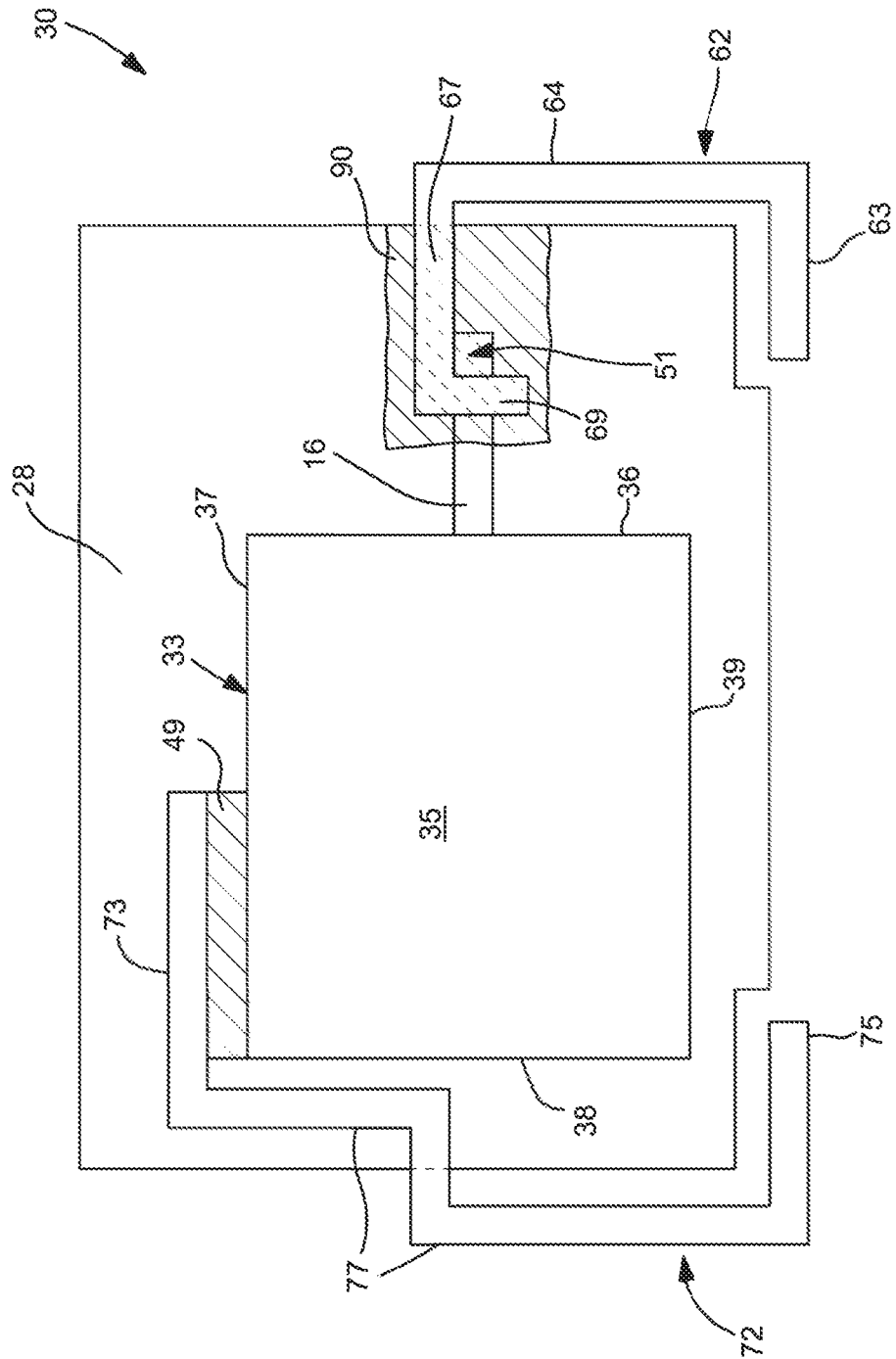

ELECTRODEPOSITED DIELECTRIC FOR A SOLID ELECTROLYTIC CAPACITOR

CROSS REFERENCE TO RELATED APPLICATION

The present application claims filing benefit of U.S. Provisional Patent Application Ser. No. 63/257,631 having a filing date of Oct. 22, 2021, which is incorporated herein by reference in its entirety.

BACKGROUND OF THE INVENTION

Solid electrolytic capacitors (e.g., tantalum capacitors) are typically made by pressing a metal powder (e.g., tantalum) around a metal lead wire, sintering the pressed part, anodically oxidizing ("anodizing") the sintered anode, and thereafter applying a solid electrolyte. Anodic oxidation is generally performed to form a dielectric over and/or within the sintered anode. For example, a tantalum (Ta) anode may be anodically oxidized in the presence of an aqueous electrolyte to form a tantalum pentoxide ($Ta_2O_5$) dielectric. Unfortunately, one of the problems with such conventional dielectrics is that they lack a sufficient quality to achieve a high surface area, which inherently limits the overall capacitance and energy density that can be achieved for the resulting capacitor. As such, a need currently exists for an improved technique for forming a dielectric of a solid electrolytic capacitor.

SUMMARY OF THE INVENTION

In accordance with one embodiment of the present invention, a method for forming a solid electrolytic capacitor that includes an anode containing a valve metal composition, a dielectric overlying the anode, and a solid electrolyte overlying the dielectric is disclosed. The method comprises forming the dielectric by a process that includes placing the anode into contact with an electrolyte containing an ionic liquid and a valve metal salt and applying a potential difference between the anode and a counter electrode to form a dielectric oxide layer.

Other features and aspects of the present invention are set forth in greater detail below.

BRIEF DESCRIPTION OF THE FIGURE

A full and enabling disclosure of the present invention, including the best mode thereof, directed to one of ordinary skill in the art, is set forth more particularly in the remainder of the specification, which makes reference to the appended FIGURE in which:

FIG. 1 is a schematic illustration of one embodiment of a capacitor that may be formed in accordance with the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a technique for forming a solid electrolytic capacitor that contains an anode that includes a valve metal composition (e.g., tantalum, aluminum, niobium oxide, etc.), a dielectric that overlies the anode, and a solid electrolyte that overlies the dielectric. Notably, the dielectric is formed by a process that includes the electrodeposition of one or more dielectric oxide layers (e.g., $Ta_2O_5$, $Al_2O_5$, $Nb_2O_5$, etc.) through the use of an electrolyte that contains an ionic liquid and a valve metal salt.

The ionic liquid is a salt that contains a cationic species and a counterion. To help minimize the presence of moisture during formation of the dielectric, it is generally desired that the cationic species and counterion are selected so that the resulting salt is hydrophobic in nature. The cationic species, for instance, may be a compound having at least one heteroatom (e.g., nitrogen or phosphorous) as a "cationic center." Suitable cationic species may include, for instance, a pyridinium, pyramidinium, pyrazinium, imidazolium, pyrazolium, oxazolium, 1,2,3-triazolium, 1,2,4-triazolium, thiazolium, quinolium, isoquinolinium, piperdinium, pyrrolidnium, etc., as well as combinations thereof. Particularly suitable cationic species may include, for instance, pyrrolidinium and/or imidazolium. Examples of suitable pyrrolidinium cationic species may include 1,1-dimethyl-pyrrolidinium, 1-methyl ethylpyrrolidinium, 1-methyl-1-propylpyrrolidinium, 1-methyl-1-butylpyrrolidinium, 1-methyl-1-pentylpyrrolidinium, 1-methyl-1-hexylpyrrolidinium, 1-methyl heptylpyrrolidinium, 1-methyl-1-octylpyrrolidinium, 1-methyl-1-nonylpyrrolidinium, 1-methyl-1-decylpyrrolidinium, 1,1-diethylpyrrolidinium, 1-ethyl propylpyrrolidinium, 1-ethyl-1-butylpyrrolidinium, 1-ethyl-1-pentylpyrrolidinium, 1-ethyl-1-hexylpyrrolidinium, 1-ethyl-1-heptylpyrrolidinium, 1-ethyl octylpyrrolidinium, 1-ethyl-1-nonylpyrrolidinium, 1-ethyl-1-decylpyrrolidinium, 1,1-dipropylpyrrolidinium, 1-propyl-1-methylpyrrolidinium, 1-propyl-1-butylpyrrolidinium, 1-propyl-1-pentylpyrrolidinium, 1-propyl-1-hexylpyrrolidinium, 1-propyl-1-heptylpyrrolidinium, 1-propyl-1-octylpyrrolidinium, 1-propyl-1-nonylpyrrolidinium, 1-propyl-1-decylpyrrolidinium, 1,1-dibutylpyrrolidinium, 1-butyl-1-methylpyrrolidinium, 1-butyl-1-pentylpyrrolidinium, 1-butyl-1-hexylpyrrolidinium, 1-butyl-1-heptylpyrrolidinium, 1-butyl-1-octylpyrrolidinium, 1-butyl-1-nonylpyrrolidinium, 1-butyl-1-decylpyrrolidinium, 1,1-dipentylpyrrolidinium, 1-pentyl-1-hexylpyrrolidinium, 1-pentyl-1-heptylpyrrolidinium, 1-pentyl-1-octylpyrrolidinium, 1-pentyl-1-nonylpyrrolidinium, 1-pentyl-1-decylpyrrolidinium, 1,1-dihexylpyrrolidinium, 1-hexyl-1-heptylpyrrolidinium, 1-hexyl-1-octylpyrrolidinium, 1-hexyl-1-nonylpyrrolidinium, 1-hexyl-1-decylpyrrolidinium, 1,1-dihexylpyrrolidinium, 1-hexyl-1-heptylpyrrolidinium, 1-hexyl-1-octylpyrrolidinium, 1-hexyl-1-nonylpyrrolidinium, 1-hexyl-1-decylpyrrolidinium, 1,1-diheptylpyrrolidinium, 1-heptyl-1-octylpyrrolidinium, 1-heptyl-1-nonylpyrrolidinium, 1-heptyl-1-decylpyrrolidinium, 1,1-dioctylpyrrolidinium, 1-octyl-1-nonyl-pyrrolidinium, 1-octyl-1-decylpyrrolidinium, 1,1-dinonylpyrrolidinium, 1-nonyl-1-decylpyrrolidinium, 1,1-didecylpyrrolidinium, and so forth. Likewise, suitable examples of the imidazolium cationic species may include 1,3-dimethylimidazolium, 1-ethyl-3-methylimidazolium, 1,3-diethylimidazolium, 3-ethyl-1,2-dimethylimidazolium, 1,2-dimethyl-3-propylimidazolium, 4-ethyl-1,2,3-trimethylimidazolium, 2,4-diethyl-1,3,4-trimethylimidazolium, 2-ethyl-1,3,4-trimethylimidazolium, 2,3-diethyl-1,4-dimethylimidazolium, 2,3,4-triethyl-1-methylimidazolium, 1,2-diethyl-3,4-dimethylimidazolium, 1,2,4-triethyl-3-methylimidazolium, and so forth.

The counterion is also typically selected to help ensure that the ionic liquid is in the form of a hydrophobic salt. Suitable counterions for this purpose may include, for instance, halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate), fatty acid carboxylates (e.g., oleate, isostearate, pentadecafluorooctanoate, etc.); cyanates; acetates; and so forth, as well as combinations of any of the foregoing. Particularly suitable counterions for use in forming hydrophobic salts may include, for instance, bis(pentafluoroethylsulfonyl)imide, bis(trifluoromethylsulfonyl)imide, and bis(trifluoromethyl)imide, trifluorotris(pentafluoroethyl)phosphate, and so forth.

To initiate the formation of the dielectric onto the anode, the electrolyte also contains a valve metal salt. Without intending to be limited by theory, it is believed that the presence of the valve metal salt can allow a thin valve metal layer (e.g., tantalum) to form on the surface of the anode, thereby acting as a seed layer for the subsequent growth of the dielectric oxide (e.g., $Ta_2O_5$) thereon. In one embodiment, for example, the valve metal salt may be a halide salt, such as a fluoride, chloride, bromide, or iodide salt. The valve metal may likewise include tantalum, aluminum, niobium, hafnium, titanium, alloys thereof, and so forth. Typically, it is desired to employ a valve metal salt in which the valve metal is selected to be the same as the valve metal used in the anode. For instance, suitable valve metal salts for an anode containing tantalum may include, for instance, tantalum pentafluoride ($TaF_5$), tantalum pentabromide ($TaBr_5$), tantalum pentaiodide ($TaI_5$), etc., and suitable valve metal salts for an anode containing niobium oxide (e.g., NbO) may include niobium pentafluoride ($NbF_5$), niobium pentabromide ($NbBr_5$), niobium pentaiodide ($NbI_5$), etc. Of course, this is by no means required and it is also possible to employ, for instance, a niobium salt for an anode containing tantalum.

The concentration of the valve metal salt and the ionic liquid may be selectively controlled to achieve the desired properties of the resulting electrodeposited dielectric. For instance, the molar ratio of the ionic liquid to the valve metal salt is typically from about 1 to about 50, in some embodiments from about 2 to about 40, in some embodiments from about 5 to about 35, and in some embodiments, from about 6 to about 20. The molarity of the valve metal salt in the electrolyte may, for example, range from about 0.01 to about 2 M, in some embodiments from about 0.05 to about 1 M, and in some embodiments, from about 0.1 to about 0.5 M. The molarity of the ionic liquid in the electrolyte may, for example, range from about 0.1 to about 15 M, in some embodiments from about 0.5 to about 10 M, and in some embodiments, from about 1 to about 5 M.

Other optional components may also be employed in the electrolyte. For instance, to help achieve the desired degree of electrodeposition, it is generally desired that the electrolyte has an ionic conductivity of about 1 milliSiemens per centimeter ("mS/cm") or more, in some embodiments about 5 mS/cm or more, and in some embodiments, from about 8 mS/cm to about 10 mS/cm, determined at a temperature of 25° C. If desired, one or more ionic compounds may be employed in the electrolyte to help achieve the desired conductivity. In one embodiment, for example, a non-valve metal halide salt may be employed, such as a salt containing lithium, sodium, etc. Suitable non-valve metal salts may include, for instance, lithium pentafluoride ($LiF_5$), lithium pentabromide ($LiBr_5$), lithium pentaiodide ($LiI_5$), sodium pentafluoride ($NaF_5$), sodium pentabromide ($NaBr_5$), sodium pentaiodide ($NaI_5$), etc. The molarity of the non-valve metal salt in the electrolyte may, for example, range from about 0.01 to about 2 M, in some embodiments from about 0.05 to about 1 M, and in some embodiments, from about 0.1 to about 0.5 M.

To form the electrodeposited dielectric layer, the anode may be placed into contact with electrolyte and a potential difference may thereafter be applied between the anode and a counter electrode. For example, the anode may be partially or completely immersed within a bath containing the electrolyte. The counter electrode is typically formed from an inert conductive material, such as platinum. Valve metal ions from the valve metal salt may be reduced and deposited onto the anode at an electrical potential of from about −3 to about −0.5 V, and in some embodiments, from about −2 to about −1 V relative to the counter electrode. Oxidation of the valve metal species may likewise occur in the range of from about −0.5 to about 2 V, and in some embodiments, from about −0.5 to about 1 V relative to the counter electrode. Therefore, to help achieve a dielectric layer of sufficient quality, it is generally desired that the potential difference is applied at a variable or constant rate in the range of from about −2 to about 0.5 V, in some embodiments from about −1.8 to about −0.5 V, and in some embodiments, from about −1.6 to about −1 V. The electrodeposition process may be performed at a variety of processing conditions. Typically, the electrodeposition process is performed at an elevated temperature at which the ionic conductivity of the electrolyte is increased. For instance, the temperature may be from about 50° C. to about 300° C., such as from about 100° C. to about 250° C., such as from about 150° C. to about 225° C. Alternatively, the electrodeposition process may be similarly performed at ambient temperatures. Moreover, the electrodeposition process is performed in the presence of an inert gas, such as argon gas or nitrogen gas, to minimize side reactions between components of the electrodeposition system with water and oxygen in the atmosphere.

Without intending to be limited by theory, it is believed that a dielectric formed in this manner may exhibit a relatively high surface area, which can allow the resulting capacitor to exhibit an improved capacitance and energy density. For example, the capacitance of the resulting capacitor may be about 1 milliFarad per square centimeter ("$mF/cm^2$") or more, in some embodiments about 2 $mF/cm^2$ or more, in some embodiments from about 5 to about 50 $mF/cm^2$, and in some embodiments, from about 8 to about 20 $mF/cm^2$. Moreover, the capacitor may exhibit an energy density of about 2.0 joules per cubic centimeter ($J/cm^3$) or more, in some embodiments about 3.0 $J/cm^3$, in some embodiments from about 3.5 $J/cm^3$ to about 10.0 $J/cm^3$, and in some embodiments, from about 4.0 to about 8.0 $J/cm^3$. Energy density is generally determined according to the equation $E=\frac{1}{2}*CV^2$, where C is the capacitance in farads (F) and V is the working voltage of capacitor in volts (V).

Moreover, it is believed that forming one or more electrodeposited layers can result in a dielectric having a relatively homogeneous structure and/or thickness, which can help protect the anode at locations where oxide flaws are more vulnerable to current surges experienced at high voltages. Consequently, the capacitor may be able to exhibit a relatively high "breakdown voltage" (voltage at which the capacitor fails) under a variety of different conditions. The breakdown voltage may, for example, be about 2 volts or more, in some embodiments about 5 volts or more, in some embodiments about 10 volts or more, in some embodiments about 30 volts or more, in some embodiments about 60 volts or more, and in some embodiments, from about 80 to about 300 volts. Such a high breakdown voltage may allow the capacitor to be employed at high rated voltages, such as about 35 volts or more, in some embodiments about 50 volts or more, and in some embodiments, from about 60 volts to about 300 volts.

The ESR of the resulting capacitor may also be relatively low, such as about 200 mohms or less, in some embodiments about 150 mohms or less, and in some embodiments, from about 0.1 to about 100 mohms, measured at an operating frequency of 100 kHz and temperature of about 23° C. The capacitor can also maintain good electrical properties even under extreme conditions, such as at high humidity levels, such as a relative humidity of about 40% or more, in some embodiments about 45% or more, in some embodiments about 50% or more, and in some embodiments, about 60% or more (e.g., about 60% to about 85%). Relative humidity may, for instance, be determined in accordance with ASTM E337-02, Method A (2007). The capacitor may, for instance, exhibit ESR values within the ranges noted above when exposed to the high humidity atmosphere (e.g., 60% relative humidity). The capacitor may also exhibit a leakage current ("DCL") of about 50 microamps ("μA") or less, in some embodiments about 40 μA or less, in some embodiments about 20 μA or less, and in some embodiments, from about 0.1 to about 10 μA. Leakage current may be measured using a leakage test meter at a temperature of 23° C.±2° C. and at the rated voltage (e.g., 16 volts) after a minimum of 60 seconds (e.g., 180 seconds, 300 seconds). The dissipation factor of the capacitor may also be maintained at relatively low levels. The dissipation factor generally refers to losses that occur in the capacitor and is usually expressed as a percentage of the ideal capacitor performance. For example, the dissipation factor of the capacitor of the present invention is typically from about 1% to about 25%, in some embodiments from about 3% to about 15%, and in some embodiments, from about 5% to about 10%, as determined at a frequency of 120 Hz and temperature of about 23° C. The dissipation factor may be measured using a Keithley 3330 Precision LCZ meter with Kelvin Leads with 2.2 volt DC bias and a 0.5 volt peak to peak sinusoidal signal.

Various embodiments of the capacitor will now be described in more detail.

I. Capacitor Element

A. Anode

The anode contains a valve metal composition that includes a valve metal (i.e., metal that is capable of oxidation) or an electrically conductive valve metal-based compound, such as electrically conductive oxides or nitrides of tantalum, niobium, aluminum, hafnium, titanium, alloys thereof, and so forth. For example, the anode may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05, such as $NbO_{0.7}$, $NbO_{1.0}$, $NbO_{1.1}$, and $NbO_2$. In other embodiments, the anode may contain tantalum.

The anode may be provided in a variety of different forms, such as a porous body, foil, mesh, sheet, plate, etc. In one embodiment, for example, the anode may be a porous body that is formed from a powder. For example, a tantalum powder may be formed from a reduction process in which a tantalum salt (e.g., potassium fluorotantalate ($K_2TaF_7$), sodium fluorotantalate ($Na_2TaF_7$), tantalum pentachloride ($TaCl_5$), etc.) is reacted with a reducing agent. The reducing agent may be provided in the form of a liquid, gas (e.g., hydrogen), or solid, such as a metal (e.g., sodium), metal alloy, or metal salt. In one embodiment, for instance, a tantalum salt (e.g., $TaCl_5$) may be heated at a temperature of from about 900° C. to about 2,000° C., in some embodiments from about 1,000° C. to about 1,800° C., and in some embodiments, from about 1,100° C. to about 1,600° C., to form a vapor that can be reduced in the presence of a gaseous reducing agent (e.g., hydrogen). Additional details of such a reduction reaction may be described in WO 2014/199480 to Maeshima, et al. After the reduction, the product may be cooled, crushed, and washed to form the electrically conductive powder.

Regardless of the material employed, the specific charge of the powder typically varies from about 2,000 to about 800,000 microFarads*Volts per gram ("μF*V/g") depending on the desired application. As is known in the art, the specific charge may be determined by multiplying capacitance by the anodizing voltage employed, and then dividing this product by the weight of the anodized electrode body. For instance, a low charge powder may be employed that has a specific charge of from about 2,000 to about 70,000 μF*V/g, in some embodiments from about 5,000 to about 60,000 μF*V/g, and in some embodiments, from about 10,000 to about 50,000 μF*V/g. Such electrically conductive powders are particularly desirable for high voltage applications. Of course, in other embodiments, high charge powders may also be employed, such as those having a specific charge of from about 70,000 to about 800,000 μF*V/g, in some embodiments from about 80,000 to about 700,000 μF*V/g, and in some embodiments, from about 100,000 to about 600,000 μF*V/g.

The powder may be a free-flowing, finely divided powder that contains primary particles. The primary particles of the electrically conductive powder generally have a median size (D50) of from about 5 to about 500 nanometers, in some embodiments from about 10 to about 400 nanometers, and in some embodiments, from about 20 to about 250 nanometers, such as determined using a laser particle size distribution analyzer made by BECKMAN COULTER Corporation (e.g., LS-230), optionally after subjecting the particles to an ultrasonic wave vibration of 70 seconds. The primary particles typically have a three-dimensional granular shape (e.g., nodular or angular). Such particles typically have a relatively low "aspect ratio", which is the average diameter or width of the particles divided by the average thickness ("D/T"). For example, the aspect ratio of the particles may be about 4 or less, in some embodiments about 3 or less, and in some embodiments, from about 1 to about 2. In addition to primary particles, the powders may also contain other types of particles, such as secondary particles formed by aggregating (or agglomerating) the primary particles. Such secondary particles may have a median size (D50) of from about 1 to about 500 micrometers, and in some embodiments, from about 10 to about 250 micrometers.

Agglomeration of the particles may occur by heating the particles and/or through the use of a binder. For example, agglomeration may occur at a temperature of from about 0° C. to about 40° C., in some embodiments from about 5° C. to about 35° C., and in some embodiments, from about 15° C. to about 30° C. Suitable binders may likewise include, for instance, poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc.

The powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead, which may be in the form of a wire, sheet, etc. The lead may extend in a longitudinal direction from the anode and may be formed from any electrically conductive material, such as tantalum, niobium, aluminum, hafnium, titanium, etc., as well as electrically conductive oxides and/or nitrides of thereof. Connection of the lead may also be accomplished using other known techniques, such as by welding the lead to the body or embedding it within the anode during formation (e.g., prior to compaction and/or sintering).

Any binder may be removed after pressing by heating the pellet under vacuum at a certain temperature (e.g., from about 150° C. to about 500° C.) for several minutes. Alternatively, the binder may also be removed by contacting the pellet with an aqueous solution, such as described in U.S. Pat. No. 6,197,252 to Bishop, et al. Thereafter, the pellet is sintered to form a porous, integral mass. The pellet is typically sintered at a temperature of from about 700° C. to about 1900° C., in some embodiments from about 800° C. to about 1800° C., and in some embodiments, from about 900° C. to about 1600° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing or inert atmosphere, such as in a vacuum, inert gas, hydrogen, etc. The atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

In certain embodiments, the porous body may contain a valve metal composition that is deposited onto a non-conductive support structure. The non-conductive support structure may, for instance, include a ceramic material, such as alumina ($Al_2O_3$), aluminum nitride (AlN), beryllium oxide (BeO), aluminum oxide ($Al_2O_3$), boron nitride (BN), silicon (Si), silicon carbide (SiC), silica ($SiO_2$), silicon nitride ($Si_3N_4$), gallium arsenide (GaAs), gallium nitride (GaN), zirconium dioxide ($ZrO_2$), mixtures thereof, nonconductive oxides and/or nitrides of such materials, or any other suitable ceramic material. Additional example ceramic materials include barium titanate ($BaTiO_3$), calcium titanate ($CaTiO_3$), zinc oxide (ZnO), ceramics containing low-fire glass, or other glass-bonded materials. A valve metal composition (e.g., tantalum) may be deposited onto the non-conductive support structure in a variety of ways. In one embodiment, for instance, the valve metal composition may be electrodeposited, vapor deposited (e.g., physical vapor deposition, chemical vapor deposition, atomic layer deposition, etc.), and so forth.

B. Dielectric

As indicated above, a dielectric overlies the anode and contains one or more dielectric oxide layers (e.g., $Ta_2O_5$, $Al_2O_5$, $Nb_2O_5$, etc.) that are electrodeposited through the use of an electrolyte that contains an ionic liquid and a valve metal salt. The entire dielectric may be formed by electrodeposition. Alternatively, one or more layers of the dielectric may be initially electrodeposited onto the anode and thereafter additional dielectric thickness may be grown through anodic oxidation. In yet other embodiments, a portion of the dielectric may be initially formed through anodic oxidation and thereafter additional dielectric thickness may be grown through electrodeposition of one or more dielectric oxide layers.

When employed, anodic oxidation is typically performed by applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed. A current may be passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 5 to about 200 V, and in some embodiments, from about 10 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

C. Solid Electrolyte

A solid electrolyte also overlies the dielectric and generally functions as the cathode for the capacitor. The solid electrolyte may include materials as is known in the art, such as conductive polymers (e.g., polypyrroles, polythiophenes, polyanilines, etc.), manganese dioxide, and so forth. In one embodiment, for example, the solid electrolyte contains one or more layers containing extrinsically and/or intrinsically conductive polymer particles. One benefit of employing such particles is that they can minimize the presence of ionic species (e.g., $Fe^{2+}$ or $Fe^{3+}$) produced during conventional in situ polymerization processes, which can cause dielectric breakdown under high electric field due to ionic migration. Thus, by applying the conductive polymer as pre-polymerized particles rather through in situ polymerization, the resulting capacitor may exhibit a relatively high "breakdown voltage." If desired, the solid electrolyte may be formed from one or multiple layers. When multiple layers are employed, it is possible that one or more of the layers includes a conductive polymer formed by in situ polymerization. However, when it is desired to achieve very high breakdown voltages, the solid electrolyte may desirably be formed primarily from the conductive particles described above, such that it is generally free of conductive polymers formed via in situ polymerization. Regardless of the number of layers employed, the resulting solid electrolyte typically has a total a thickness of from about 1 micrometer (μm) to about 200 μm, in some embodiments from about 2 μm to about 50 μm, and in some embodiments, from about 5 μm to about 30 μm.

Thiophene polymers are particularly suitable for use in the solid electrolyte. In certain embodiments, for instance, an "extrinsically" conductive thiophene polymer may be employed in the solid electrolyte that has repeating units of the following formula (I):

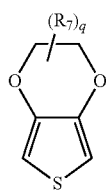
(I)

wherein,
  $R_7$ is a linear or branched, $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); $C_5$ to $C_{12}$ cycloalkyl radical (e.g., cyclopentyl, cyclohexyl, cycloheptyl, cyclooctyl, cyclononyl, cyclodecyl, etc.); $C_6$ to $C_{14}$ aryl radical (e.g., phenyl, naphthyl, etc.); $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); and
  q is an integer from 0 to 8, in some embodiments, from 0 to 2, and in one embodiment, 0. In one particular embodiment, "q" is 0 and the polymer is poly(3,4-ethylenedioxythiophene). One commercially suitable example of a monomer suitable for forming such a polymer is 3,4-ethylenedioxthiophene, which is available from Heraeus under the designation Clevios™ M.

The polymers of formula (I) are generally considered to be "extrinsically" conductive to the extent that they typically require the presence of a separate counterion that is not covalently bound to the polymer. The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

Intrinsically conductive polymers may also be employed that have a positive charge located on the main chain that is at least partially compensated by anions covalently bound to the polymer. For example, one example of a suitable intrinsically conductive thiophene polymer may have repeating units of the following formula (II):

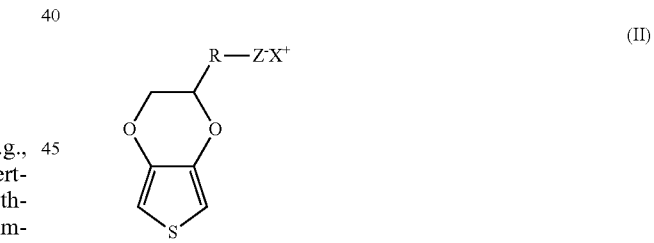
(II)

wherein,
  R is $(CH_2)_a$—O—$(CH_2)_b$-L, where L is a bond or $HC([CH_2]_cH)$,
  a is from 0 to 10, in some embodiments from 0 to 6, and in some embodiments, from 1 to 4 (e.g., 1);
  b is from 1 to 18, in some embodiments from 1 to 10, and in some embodiments, from 2 to 6 (e.g., 2, 3, 4, or 5);
  c is from 0 to 10, in some embodiments from 0 to 6, and in some embodiments, from 1 to 4 (e.g., 1);
  Z is an anion, such as $SO_3^-$, $C(O)O^-$, $BF_4^-$, $CF_3SO_3^-$, $SbF_6^-$, $N(SO_2CF_3)_2^-$, $C_4H_3O_4^-$, $ClO_4^-$, etc.;
  X is a cation, such as hydrogen, an alkali metal (e.g., lithium, sodium, rubidium, cesium, or potassium), ammonium, etc.

In one particular embodiment, Z in formula (II) is a sulfonate ion such that the intrinsically conductive polymer contains repeating units of the following formula (III):

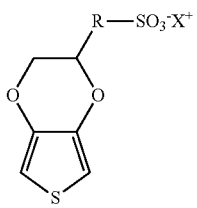 (III)

wherein, R and X are defined above. In formula (II) or (III), a is preferably 1 and b is preferably 3 or 4. Likewise, X is preferably sodium or potassium.

If desired, the polymer may be a copolymer that contains other types of repeating units. In such embodiments, the repeating units of formula (II) typically constitute about 50 mol. % or more, in some embodiments from about 75 mol. % to about 99 mol. %, and in some embodiments, from about 85 mol. % to about 95 mol. % of the total amount of repeating units in the copolymer. Of course, the polymer may also be a homopolymer to the extent that it contains 100 mol. % of the repeating units of formula (II). Specific examples of such homopolymers include poly(4-(2,3-dihydrothieno-[3,4-b][1,4]dioxin-2-ylmethoxy)-1-butane-sulphonic acid, salt) and poly(4-(2,3-dihydrothieno-[3,4-b][1,4]dioxin-2-ylmethoxy)-1-propanesulphonic acid, salt).

Regardless of the particular nature of the polymer, the resulting conductive polymer particles typically have an average size (e.g., diameter) of from about 1 to about 80 nanometers, in some embodiments from about 2 to about 70 nanometers, and in some embodiments, from about 3 to about 60 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc.

Although not necessarily required, the conductive polymer particles may be applied in the form of a dispersion. The concentration of the conductive polymer in the dispersion may vary depending on the desired viscosity of the dispersion and the particular manner in which the dispersion is to be applied to the capacitor element. Typically, however, the polymer constitutes from about 0.1 to about 10 wt. %, in some embodiments from about 0.4 to about 5 wt. %, and in some embodiments, from about 0.5 to about 4 wt. % of the dispersion. The dispersion may also contain one or more components to enhance the overall properties of the resulting solid electrolyte. For example, the dispersion may contain a binder to further enhance the adhesive nature of the polymeric layer and also increase the stability of the particles within the dispersion. The binder may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or crosslinkable polymers, such as polyurethanes, polyacrylates or polyolefins, and subsequent crosslinking. Dispersion agents may also be employed to facilitate the ability to apply the layer to the anode. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The dispersion may be applied using a variety of known techniques, such as by spin coating, impregnation, pouring, dropwise application, injection, spraying, doctor blading, brushing, printing (e.g., ink-jet, screen, or pad printing), or dipping. The viscosity of the dispersion is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 meas.

i. Inner Layers

The solid electrolyte is generally formed from one or more "inner" conductive polymer layers. The term "inner" in this context refers to one or more layers that overly the dielectric, whether directly or via another layer (e.g., pre-coat layer). One or multiple inner layers may be employed. For example, the solid electrolyte typically contains from 2 to 30, in some embodiments from 4 to 20, and in some embodiments, from about 5 to 15 inner layers (e.g., 10 layers). The inner layer(s) may, for example, contain intrinsically and/or extrinsically conductive polymer particles such as described above. For instance, such particles may constitute about 50 wt. % or more, in some embodiments about 70 wt. % or more, and in some embodiments, about 90 wt. % or more (e.g., 100 wt. %) of the inner layer(s). In alternative embodiments, the inner layer(s) may contain an in-situ polymerized conductive polymer. In such embodiments, the in-situ polymerized polymers may constitute about 50 wt. % or more, in some embodiments about 70 wt. % or more, and in some embodiments, about 90 wt. % or more (e.g., 100 wt. %) of the inner layer(s).

iii. Outer Layers

The solid electrolyte may also contain one or more optional "outer" conductive polymer layers that overly the inner layer(s) and are formed from a different material. For example, the outer layer(s) may contain extrinsically conductive polymer particles. In one particular embodiment, the outer layer(s) are formed primarily from such extrinsically conductive polymer particles in that they constitute about 50 wt. % or more, in some embodiments about 70 wt. % or more, and in some embodiments, about 90 wt. % or more (e.g., 100 wt. %) of a respective outer layer. One or multiple outer layers may be employed. For example, the solid electrolyte may contain from 2 to 30, in some embodiments from 4 to 20, and in some embodiments, from about 5 to 15 outer layers, each of which may optionally be formed from a dispersion of the extrinsically conductive polymer particles.

D. External Polymer Coating

An external polymer coating may also overly the solid electrolyte. The external polymer coating may contain one or more layers formed from pre-polymerized conductive polymer particles such as described above (e.g., dispersion of extrinsically conductive polymer particles). The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating typically have a larger size than those employed in the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments, from about 5 to about 15. For example, the particles employed in the dispersion of the external coating may have an average size of from about 80 to about 500 nanometers, in some embodiments from about 90 to about 250 nanometers, and in some embodiments, from about 100 to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl) cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent is typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting, or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 to about 50 μm, in some embodiments from about 2 to about 40 μm, and in some embodiments, from about 5 to about 20 μm.

E. Cathode Coating

If desired, the capacitor element may also employ a cathode coating that overlies the solid electrolyte and other optional layers (e.g., external polymer coating). The cathode coating may contain a metal particle layer includes a plurality of conductive metal particles dispersed within a polymer matrix. The particles typically constitute from about 50 wt. % to about 99 wt. %, in some embodiments from about 60 wt. % to about 98 wt. %, and in some embodiments, from about 70 wt. % to about 95 wt. % of the layer, while the polymer matrix typically constitutes from about 1 wt. % to about 50 wt. %, in some embodiments from about 2 wt. % to about 40 wt. %, and in some embodiments, from about 5 wt. % to about 30 wt. % of the layer.

The conductive metal particles may be formed from a variety of different metals, such as copper, nickel, silver, nickel, zinc, tin, lead, copper, aluminum, molybdenum, titanium, iron, zirconium, magnesium, etc., as well as alloys thereof. Silver is a particularly suitable conductive metal for use in the layer. The metal particles often have a relatively small size, such as an average size of from about 0.01 to about 50 micrometers, in some embodiments from about 0.1 to about 40 micrometers, and in some embodiments, from about 1 to about 30 micrometers. Typically, only one metal particle layer is employed, although it should be understood that multiple layers may be employed if so desired. The total thickness of such layer(s) is typically within the range of from about 1 μm to about 500 μm, in some embodiments from about 5 μm to about 200 μm, and in some embodiments, from about 10 μm to about 100 μm.

The polymer matrix typically includes a polymer, which may be thermoplastic or thermosetting in nature. Typically, however, the polymer is selected so that it can act as a barrier to electromigration of silver ions, and also so that it contains a relatively small amount of polar groups to minimize the degree of water adsorption in the cathode coating. In this regard, the present inventors have found that vinyl acetal polymers are particularly suitable for this purpose, such as polyvinyl butyral, polyvinyl formal, etc. Polyvinyl butyral, for instance, may be formed by reacting polyvinyl alcohol with an aldehyde (e.g., butyraldehyde). Because this reaction is not typically complete, polyvinyl butyral will generally have a residual hydroxyl content. By minimizing this content, however, the polymer can possess a lesser degree of strong polar groups, which would otherwise result in a high degree of moisture adsorption and result in silver ion migration. For instance, the residual hydroxyl content in polyvinyl acetal may be about 35 mol. % or less, in some embodiments about 30 mol. % or less, and in some embodiments, from about 10 mol. % to about 25 mol. %. One commercially available example of such a polymer is available from Sekisui Chemical Co., Ltd. under the designation "BH-S" (polyvinyl butyral).

To form the cathode coating, a conductive paste is typically applied to the capacitor that overlies the solid electrolyte. One or more organic solvents are generally employed in the paste. A variety of different organic solvents may generally be employed, such as glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., benzyl alcohol, methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); etc., as well as mixtures thereof. The organic solvent(s) typically constitute from about 10 wt. % to about 70 wt. %, in some embodiments from about 20 wt. % to about 65 wt. %, and in some embodiments, from about 30 wt. % to about 60 wt. %. of the paste. Typically, the metal particles constitute from about 10 wt. % to about 60 wt. %, in some embodiments from about 20 wt. % to about 45 wt. %, and in some embodiments, from about 25 wt. % to about 40 wt. % of the paste, and the resinous matrix constitutes from about 0.1 wt. % to about 20 wt. %, in some embodiments from about 0.2 wt. % to about 10 wt. %, and in some embodiments, from about 0.5 wt. % to about 8 wt. % of the paste.

The paste may have a relatively low viscosity, allowing it to be readily handled and applied to a capacitor element. The viscosity may, for instance, range from about 50 to about 3,000 centipoise, in some embodiments from about 100 to about 2,000 centipoise, and in some embodiments, from about 200 to about 1,000 centipoise, such as measured with a Brookfield DV-1 viscometer (cone and plate) operating at a speed of 10 rpm and a temperature of 25° C. If desired, thickeners or other viscosity modifiers may be employed in the paste to increase or decrease viscosity. Further, the thickness of the applied paste may also be relatively thin and still achieve the desired properties. For example, the thickness of the paste may be from about 0.01 to about 50 micrometers, in some embodiments from about 0.5 to about 30 micrometers, and in some embodiments, from about 1 to about 25 micrometers. Once applied, the metal paste may be optionally dried to remove certain components, such as the organic solvents. For instance, drying may occur at a temperature of from about 20° C. to about 150° C., in some embodiments from about 50° C. to about 140° C., and in some embodiments, from about 80° C. to about 130° C.

F. Other Components

If desired, the capacitor may also contain other layers as is known in the art. In certain embodiments, for instance, a carbon layer (e.g., graphite) may be positioned between the solid electrolyte and the silver layer that can help further limit contact of the silver layer with the solid electrolyte. In addition, a pre-coat layer may also be employed that overlies the dielectric and includes an organometallic compound, such as described in more detail below.

II. Terminations

Once the desired layers are formed, the capacitor may be provided with terminations as indicated above. More particularly, the capacitor contains an anode termination to which an anode lead of the capacitor element is electrically connected and a cathode termination to which the solid electrolyte of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

The terminations may be connected to the capacitor element using any technique known in the art. In one embodiment, for example, a lead frame may be provided that defines the cathode termination and anode termination. To attach the capacitor element to the lead frame, a conductive adhesive may initially be applied to a surface of the cathode termination. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al. Any of a variety of techniques may be used to apply the conductive adhesive to the cathode termination. Printing techniques, for instance, may be employed due to their practical and cost-saving benefits. The anode lead may also be electrically connected to the anode termination using any technique known in the art, such as mechanical welding, laser welding, conductive adhesives, etc. Upon electrically connecting the anode lead to the anode termination, the conductive adhesive may then be cured to ensure that the electrolytic capacitor is adequately adhered to the cathode termination.

Referring to FIG. 1, for example, a capacitor 30 is shown as including an anode termination 62 and a cathode termination 72 in electrical connection with a capacitor element 33 having an upper surface 37, lower surface 39, front surface 36, rear surface 38, first side surface 35, and opposing side surface (not shown). The cathode termination 72 may be provided in electrical contact with any surface of the capacitor element, such as via a conductive adhesive. In the illustrated embodiment, for example, the cathode termination 72 contains a first component 73 that is generally parallel and adjacent to the upper surface 37 and a second component 75 that is generally parallel and adjacent to the lower surface 39. The first component 73 is also in electrical contact with the upper surface 37. The cathode termination 72 may also contain a third component 77 generally extends in a direction perpendicular to the first component 73 and second component 75. If desired, the third component 77 may also be provided in electrical contact with the rear surface 38 of the capacitor element 33. The anode termination 62 likewise contains a first component 63 that is generally parallel to the lower surface 39 of the capacitor element 33 and a second component 67 that is generally parallel to the anode lead 16. Further, the anode termination 62 may include a third component 64 that is generally perpendicular to the first component 63 and a fourth component 69 that is generally perpendicular to the second component 67 and located adjacent to the anode lead 16. In the illustrated embodiment, the second component 67 and fourth component 69 define a region 51 for connection to the anode lead 16. Although not depicted in FIG. 1, the region 51 may possess a "U-shape" to further enhance surface contact and mechanical stability of the lead 16.

The terminations may be connected to the capacitor element using any technique known in the art. In one embodiment, for example, a lead frame may be provided that defines the cathode termination 72 and anode termination 62. To attach the capacitor element 33 to the lead frame, a conductive adhesive 49 may initially be applied to a surface of the cathode termination 72. In one embodiment, the anode termination 62 and cathode termination 72 are folded into the position shown in FIG. 1. Thereafter, the capacitor element 33 is positioned on the cathode termination 72 so that its lower surface 39 contacts the adhesive 49 and the anode lead 16 contacts the region 51. The anode lead 16 is then electrically connected to the region 51 using any technique known in the art, such as mechanical welding, laser welding, conductive adhesives, etc. For example, the anode lead 16 may be welded to the anode termination 62 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 16 to the anode termination 62, the conductive adhesive may then be cured. For example, a heat press may be used to apply heat and pressure to ensure that the electrolytic capacitor element 33 is adequately adhered to the cathode termination 72 by the adhesive 49.

Although by no means required, a barrier coating may also be disposed adjacent to the anode termination and/or cathode termination so that it is in contact with the casing material. One or multiple coatings may be employed. In one embodiment, for instance, a barrier coating may be employed that covers at least a portion of the anode termination. In such embodiments, the coating may also contact at least a portion of a surface of the capacitor element, such as a front surface, bottom surface, and/or top surface of the capacitor element. Likewise, the coating may also contact at least a portion of the anode lead. In another embodiment, a barrier coating may be employed that covers at least a portion of the cathode termination. In such embodiments, the coating may also contact at least a portion of a surface of the capacitor element, such as a rear surface, top surface, and/or bottom surface. Referring again to FIG. 1, for example, the capacitor 30 is shown with a barrier coating 90 that is on the anode termination 62. More particularly, in the illustrated embodiment, the coating 90 is in contact with the second component 67 and the fourth component 69 of the anode termination 62 so that the region 51 is generally covered. The coating 90 is also in contact with at least a portion of the anode lead 16, particularly at those locations surrounding the region 51 at which the lead 16 is connected to the anode termination 62. Of course, it should be understood that the coating may also be provided in other configurations and disposed on any surface desired. In one embodiment, for example, the coating may contact only the second component 67 of the anode termination 62.

Regardless of its location, the barrier coating may contain a polymeric material having a glass transition temperature of from about 10° C. to about 120° C., in some embodiments from about 20° C. to about 100° C., in some embodiments from about 30° C. to about 80° C., and in some embodiments, from about 35° C. to about 50° C., such as determined in accordance with JIS K 7121:2012 (e.g., at a rate of temperature increase of 10° C./min). The thermal decomposition temperature of the polymeric material is also relatively high, such as from about 200° C. to about 300° C., in some embodiments from about 210° C. to about 290° C., and in some embodiments, from about 220° C. to about 280° C. The thermal decomposition temperature may be determined from a graph obtained by measuring the change in the mass of the polymeric material when heated from 50° C. to 450° C. at a rate of 5° C./min using a differential thermal weight simultaneous measuring device (e.g., TG/DTA6300, Hitachi). The thermal decomposition temperature is the temperature of the extrapolation at the point where the weight begins to decrease and the point where the slope of the curve is the largest. Without intending to be limited by theory, it is believed that materials having such controlled glass transition and thermal decomposition temperatures may not only act as a barrier to moisture and oxygen, but they can also help impart the resulting coating with an enhanced degree of adhesion to the casing material, which makes it less likely to delaminate from the capacitor element when exposed to the high temperatures often experienced during manufacturing of the capacitor (e.g., reflow).

Any of a variety of polymeric materials having the desired properties may be employed in the barrier coating. The polymeric material, for instance, may contain at least one fluorinated component and/or at least one non-fluorinated component. The components may be separate materials (e.g., polymers, oligomers, or non-polymeric compounds) that are simply blended together to form the polymeric material. Alternatively, the components may be separate and distinct monomeric repeating units of a single copolymer.

Regardless, the fluorinated component typically constitutes from about 30 wt. % to about 80 wt. %, and in some embodiments, from about 40 wt. % to about 75 wt. % of the polymeric material, and the non-fluorinated component constitutes from about 20 wt. % to about 70 wt. %, and in some embodiments, from about 25 wt. % to about 60 wt. %.

The fluorinated component may, for instance, be a fluorocarbon. The fluorocarbon typically contains a fluoroalkyl group having 1 to 12 carbon atoms, in some embodiments from 1 to 8 carbon atoms, and in some embodiments, from 1 to 6 carbon atoms, such as —$CF_3$, —$CF_2CF_3$, —$(CF_2)_2CF_3$, —$CF(CF_3)_2$, —$(CF_2)_3CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$, and —$(CF_2)_3CF(CF_3)_2$. The fluorocarbon may also contain an ethylenically unsaturated group having a carbon chain length of from 3 to 20 atoms, in some embodiments from 6 to 12 carbon atoms in length, and in some embodiments, from 8 to 10 carbon atoms in length. Examples of such groups may include olefins (e.g. linear, cyclic, etc.), (meth)acrylates, etc. As used herein, the term "(meth)acrylate" includes acrylics and methacrylics, as well as salts or esters thereof, such as acrylates and methacrylates. The (meth)acrylate may be unsubstituted or substituted with an alkyl group (e.g., linear olefin, cycloolefin, etc.). Examples of such (meth)acrylates may include methyl acrylate, ethyl acrylate, n-propyl acrylate, i-propyl acrylate, n-butyl acrylate, s-butyl acrylate, 1-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, n-stearyl acrylate, methylcyclohexyl acrylate, behenyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, n-octyl methacrylate, n-decyl methacrylate, n-stearyl methacrylate, cinnamyl methacrylate, crotyl methacrylate, cyclohexyl methacrylate, cyclopentyl methacrylate, 2-ethoxyethyl methacrylate, isobornyl methacrylate, behenyl methacrylate, etc., as well as combinations thereof. In one particular embodiment, for instance, the fluorocarbon is a fluoroalkyl-substituted (meth)acrylate, such as perfluorobutyl (meth)acrylate, perfluorohexyl (meth)acrylate, perfluoroheptyl (meth)acrylate, perfluorooctyl (meth)acrylate, perfluorononyl (methacrylate), perfluorodecyl (meth)acrylate, perfluoroundecyl (meth)acrylate, perfluorododecyl (meth)acrylate, etc., as well as mixtures thereof.

As noted, the polymeric material may also include a non-fluorinated component, which may be a separate material (e.g., polymer, oligomer, non-polymeric compound) or a separate and distinct monomeric repeating unit of a copolymer containing both the fluorinated component and non-fluorinated component. Of course, in embodiments in which the fluorinated component is not a polymer or a monomeric repeating unit of a copolymer, it is typically desired that the non-fluorinated component is a polymer or a monomeric repeating unit of a copolymer. Regardless, the non-fluorinated component typically contains an ethylenically unsaturated group, such as a (meth)acrylate as described above. Alkyl-substituted (meth)acrylates are particularly suitable, such as n-stearyl methacrylate, n-stearyl acrylate, cyclohexyl methacrylate, behenyl methacrylate, etc. In one particular embodiment, the polymeric material includes a copolymer that contains fluorinated monomeric repeating units, such as a fluoroalkyl-substituted (meth)acrylate as described above, as well as non-fluorinated monomeric repeating units, such as an alkyl-substituted (meth)acrylate as described above. Such a polymer may be produced using any known technique, such as solution polymerization, suspension polymerization, or emulsion polymerization. If desired, a polymerization initiator may be employed to facilitate the polymerization process, such as 2,2'-azobis-2-methylbutyronitrile, dimethyl-2,2'-azobis-2-methylpropionate, 2,2'-azobisisobutyronitrile, lauroyl peroxide, etc. Specific examples of such polymerization techniques are described, for instance, in Japanese Patent Publication Nos. 2020-10080A and 2017-132830A.

To help aid in its application, the barrier coating may be initially provided in the form of a coating formulation that contains the polymeric material in combination with an organic solvent, which is typically a liquid at room temperature. When employed, such solvents typically constitute from about 70 wt. % to about 99.9 wt. %, in some embodiments from about 80 wt. % to about 99.8 wt. %, and in some embodiments, from about 90 wt. % to about 99.5 wt. % of the formulation, while the polymeric material may constitute from about 0.1 wt. % to about 30 wt. %, in some embodiments from about 0.2 wt. % to about 20 wt. %, and in some embodiments, from about 0.5 wt. % to about 10 wt. % of the solution. The solvent(s) employed will depend in part on the nature of the polymeric material, but generally include organic alcohols, hydrocarbon solvents, fluorinated hydrocarbon solvents, etc. For example, particularly suitable solvents for use with fluoropolymers include fluorinated hydrocarbon solvents, such as hydrofluoroethers, fluorinated ketones, fluorinated aliphatic olefins, fluorinated aromatic olefins (e.g., xylene hexafluoride), etc. In one particular embodiment, for instance, the coating formulation may contain a hydrofluoroether having the following general formula:

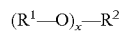

wherein:
x is 1 or 2;
one of $R^1$ and $R^2$ is a perfluoroaliphatic or perfluorocyclic group and the other is an aliphatic or a cyclic hydrocarbon group. For example, $R^1$ and/or $R^2$ may include substituted and nonsubstituted alkyl, aryl, and alkylaryl groups and their derivatives. Representative examples of suitable hydrofluoroethers include the following compounds: $C_5F_{11}OC_2H_5$, $C_3F_7OCH_3$, $C_4F_9OCH_3$, $C_4F_9OC_2H_5$, $C_3F_7OCF(CF_3)CF_2OCH_3$, $C_4F_9OC_2F_4OC_2F_4OC_2H_5$, $C_4F_9O(CF_2)_3OCH_3$, $C_3F_7CF(OC_2H_5)CF(CF_3)_2$, $C_2F_5CF(OCH_3)CF(CF_3)_2$, $C_4F_9OC_2H_4OC_4F_9$, etc. Particularly suitable are ethyl perfluoroisobutyl ether and ethyl perfluorobutyl ether, both of which are represented by the structure, $C_4F_9OC_2H_5$. Once applied, the coating may be dried, heated, and/or cured to remove any remaining solvent(s) and leave a coating of the polymeric material at the desired location.

IV. Casing Material

The capacitor element and anode lead may be generally encapsulated with a casing material so that at least a portion of the anode and cathode terminations are exposed for mounting onto a circuit board. Referring again to FIG. 1, for instance, the capacitor element 33 and anode lead 16 may be encapsulated within a casing material 28 so that a portion of the anode termination 62 and a portion of the cathode termination 72 remain exposed. Further, as noted above, at least a portion of the casing material 28 is also in contact with the barrier coating 90. The casing material may be formed from a wide variety of materials. In one embodiment, for instance, the casing material may be formed from a curable resinous matrix, which may be hydrophobic. In certain embodiments, for example, the resinous matrix may contain a polycyanate containing at least two cyanate ester groups. When cured, for example, the polycyanate may form a polycyanurate having a triazine ring. Due to the high degree of symmetry in the triazine ring, where dipoles associated with the carbon-nitrogen and carbon-oxygen bonds are counterbalanced, the resulting polycyanurate can have a relatively high degree of moisture resistance. Suitable polycyanates may include, for instance, bisphenol A dicyanate; the dicyanates of 4,4'-dihydroxydiphenyl, 4,4'-dihydroxydiphenyl oxide, resorcinyl, hydroquinone, 4,4'-thiodiphenol, 4,4'-sulfonyldiphenyl, 3,3',5,5'-tetrabromobisphenol A, 2,2',6,6'-tetrabromobisphenol A, 2,2'-dihydroxydiphenyl, 3,3'-dimethoxybisphenol A, 4,4'-dihydroxydiphenylcarbonate, dicyclopentadiene diphenol, 4,4'-dihydroxybenzophenone, 4,4'-dihydroxydiphenylmethane, tricyclopentadiene diphenol, etc.; the tricyanate of tris(hydroxyphenyl)methane, the tetracyanate of 2,2',4,4'-tetrahydroxydiphenyl methane, the polycyanate of a phenolformaldehyde condensation product (novolac); the polycyanate of a dicyclopentadiene and phenol condensation product; and so forth. If desired, the polycyanate may also contain one or more polycyclic aliphatic radicals containing two or more cyclic rings, such as a $C_7$-$C_{20}$ polycyclic aliphatic radical, including cyclopentadiene, norbornane, bornane, norbornadiene, trahydroindene, methyltetrahydroindene, dicyclopentadiene, bicyclo-(2,2, 1)-hepta-2,5-diene, 5-methylene-2-norbornene, 5-ethylidene-2-norbornene, 5-propenyl-2-norbornene, 5-(4-cyclopentenyl)-2-norbornene, 5-cyclohexylidene-2-norbornene, 5-vinyl-2-norbornene, etc. In one particular embodiment, for instance, the polycyanate may be a dicyclopentadiene bisphenol cyanate ester. Without intending to be limited by theory, it is believed such polycyclic radicals can act as a nonpolar bridging group for the polycyanate, which helps improve moisture resistance.

The resinous matrix may also contain an epoxy resin, either alone or in combination with a polycyanate. When used in combination, the epoxy resin can react with the polycyanate to form a copolymer and/or crosslink with the polycyanate resin when cured. Examples of suitable epoxy resins include, for instance, bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc. To help provide the desired degree of moisture resistance, however, it is particularly desirable to employ epoxy phenol novolac ("EPN") resins, which are glycidyl ethers of phenolic novolac resins. These resins can be prepared, for example, by reaction of phenols with an excess of formaldehyde in the presence of an acidic catalyst to produce the phenolic novolac resin. Novolac epoxy resins are then prepared by reacting the phenolic novolac resin with epichlorihydrin in the presence of sodium hydroxide. Specific examples of the novolac-type epoxy resins include a phenol-novolac epoxy resin, cresol-novolac epoxy resin, naphthol-novolac epoxy resin, naphthol-phenol co-condensation novolac epoxy resin, naphthol-cresol co-condensation novolac epoxy resin, brominated phenol-novolac epoxy resin, etc. Regardless of the type of resin selected, the resulting phenolic novolac epoxy resins typically have more than two oxirane groups and can be used to produce cured coating compositions with a high crosslinking density, which can be particularly suitable for enhancing moisture resistance. One such phenolic novolac epoxy resin is poly [(phenyl glycidyl ether)-co-formaldehyde]. Other suitable resins are commercially available under the trade designation ARALDITE (e.g., GY289, EPN 1183, EP 1179, EPN 1139, and EPN 1138) from Huntsman.

The polycyanate and/or epoxy resin may be crosslinked with a co-reactant (hardener) to further improve the mechanical properties of the composition and also enhance its overall moisture resistance as noted above. Examples of such co-reactants may include, for instance, polyamides, amidoamines (e.g., aromatic amidoamines such as aminobenzamides, aminobenzanilides, and aminobenzenesulfonamides), aromatic diamines (e.g., diaminodiphenylmethane, diaminodiphenylsulfone, etc.), aminobenzoates (e.g., trimethylene glycol di-p-aminobenzoate and neopentyl glycol di-p-amino-benzoate), aliphatic amines (e.g., triethylenetramine, isophoronediamine), cycloaliphatic amines (e.g., isophorone diamine), imidazole derivatives, guanidines (e.g., tetramethylguanidine), carboxylic acid anhydrides (e.g., methylhexahydrophthalic anhydride), carboxylic acid hydrazides (e.g., adipic acid hydrazide), phenolic-novolac resins (e.g., phenol novolac, cresol novolac, etc.), carboxylic acid amides, etc., as well as combinations thereof. Phenolic-novolac resins may be particularly suitable for use in the present invention.

The casing material may also contain an inorganic oxide filler. Such fillers are typically maintained at a high level of the casing material, such as from about 75 wt. % to about 99.5 wt. %, in some embodiments from about 76 wt. % to about 99 wt. %, and in some embodiments, from about 77 wt. % to about 90 wt. % of the casing material, while the resinous matrix typically constitutes from about 0.5 wt. % to about 25 wt. %, in some embodiments from about 1 wt. % to about 24 wt. %, and in some embodiments, from about 10 wt. % to about 23 wt. % of the casing material. The nature of the inorganic oxide fillers may vary, such as silica, alumina, zirconia, magnesium oxides, iron oxides (e.g., iron hydroxide oxide yellow), titanium oxides (e.g., titanium dioxide), zinc oxides (e.g., boron zinc hydroxide oxide), copper oxides, zeolites, silicates, clays (e.g., smectite clay), etc., as well as composites (e.g., alumina-coated silica particles) and mixtures thereof. Regardless of the particular fillers employed, however, a substantial portion, if not all, of the inorganic oxide fillers is typically in the form of vitreous silica, which is believed to further improve the resistance of the casing material to thermal expansion due to its high purity and relatively simple chemical form. Vitreous silica may, for instance, constitute about 30 wt. % or more, in some embodiments from about 35 wt. % to about 90 wt. %, and in some embodiments, from about 40 wt. % to about 80 wt. % of the total weight of fillers employed in the composition, as well as from about 20 wt. % to about 70 wt. %, in some embodiments from about 25 wt. % to about 65 wt. %, and in some embodiments, from about 30 wt. % to about 60 wt. % of the entire composition. Of course, other forms of silica may also be employed in combination with the vitreous silica, such as quartz, fumed silica, cristabolite, etc.

Apart from the components noted above, it should be understood that still other additives may also be employed in the casing material, such as photoinitiators, viscosity modifiers, suspension aiding agents, pigments, stress reducing agents, coupling agents (e.g., silane coupling agents), stabilizers, etc. When employed, such additives typically constitute from about 0.1 to about 20 wt. % of the total composition.

The particular manner in which the casing material is applied to the capacitor element may vary as desired. In one particular embodiment, the capacitor element is placed in a mold and the casing material is applied to the capacitor element so that it occupies the spaces defined by the mold and leaves exposed at least a portion of the anode and cathode terminations. The casing material may be initially provided in the form of a single or multiple compositions. For instance, a first composition may contain the resinous matrix and filler and the second composition may contain a co-reactant. Regardless, once it is applied, the casing material may be heated or allowed to stand at ambient temperatures so that the resinous matrix is allowed to crosslink with the co-reactant, which thereby causes the casing material to cure and harden into the desired shape of the case. For instance, the casing material may be heated to a temperature of from about 15° C. to about 150° C., in some embodiments from about 20° C. to about 120° C., and in some embodiments, from about 25° C. to about 100° C.

The following test methods may be employed to determine the electrical properties of a capacitor formed according to the present invention.

Capacitance

The capacitance may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C. In some cases, the "wet-to-dry" capacitance can be determined. The "dry capacitance" refers to the capacitance of the part before application of the solid electrolyte, graphite, and silver layers, while the "wet capacitance" refers to the capacitance of the part after formation of the dielectric, measured in 14% nitric acid in reference to 1 mF tantalum cathode with 10 volt DC bias and a 0.5 volt peak to peak sinusoidal signal after 30 seconds of electrolyte soaking.

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency may be 100 kHz and the temperature may be 23° C.±2° C.

Dissipation Factor

The dissipation factor may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C.

Leakage Current

Leakage current may be measured using a leakage test meter at a temperature of 23° C.±2° C. and at the rated voltage after a minimum of 60 seconds.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming a solid electrolytic capacitor that includes an anode containing a valve metal composition which includes tantalum, a dielectric overlying the anode, and a solid electrolyte overlying the dielectric, the method comprising forming the dielectric by a process that includes placing the anode into contact with an electrolyte containing an ionic liquid and a valve metal salt and applying a potential difference between the anode and a counter electrode to form a dielectric oxide layer which includes tantalum pentoxide.

2. The method of claim 1, wherein the valve metal salt includes tantalum.

3. The method of claim 2, wherein the valve metal salt includes tantalum pentafluoride, tantalum pentabromide, tantalum pentaiodide, or a combination thereof.

4. The method of claim 1, wherein the valve metal composition includes an electrically conductive niobium oxide and the dielectric oxide layer includes niobium pentoxide.

5. The method of claim 4, wherein the valve metal salt includes niobium.

6. The method of claim 5, wherein the valve metal salt includes niobium pentafluoride, niobium pentabromide, niobium pentaiodide, or a combination thereof.

7. The method of claim 1, wherein the ionic liquid contains a cationic species and a counterion.

8. The method of claim 7, wherein the cationic species includes a pyrrolidinium, imidazolium, or a combination thereof.

9. The method of claim 7, wherein the counterion includes bis(pentafluoroethylsulfonyl)imide, bis(trifluoromethylsulfonyl)imide, bis(trifluoromethyl)imide, trifluorotris(pentafluoroethyl)phosphate, or a combination thereof.

10. The method of claim 7, wherein the ionic liquid includes a hydrophobic salt.

11. The method of claim 1, wherein the molar ratio of the ionic liquid to the valve metal salt is from about 1 to about 50.

12. The method of claim 1, wherein the molarity of the valve metal salt in the electrolyte is from about 0.01 to about 2 M.

13. The method of claim 1, wherein the molarity of the ionic liquid in the electrolyte is from about 0.1 to about 15 M.

14. The method of claim 1, wherein the potential difference is from about −2 to about 0.5 V.

15. The method of claim 1, wherein the electrolyte has a temperature of from about 50° C. to about 300° C.

16. The method of claim 1, wherein the process for forming the electrolyte further comprises anodically oxidizing the anode after the dielectric oxide layer is formed.

17. The method of claim 1, wherein the process for forming the electrolyte further comprises anodically oxidizing the anode before the dielectric oxide layer is formed.

18. The method of claim 1, wherein the anode is in the form of a sintered porous body.

19. The method of claim 1, wherein the anode is in the form of a foil.

20. The method of claim 1, wherein the anode is in the form of a porous body that contains a non-conductive support structure on which is deposited the valve metal composition.

21. The method of claim 1, wherein the solid electrolyte contains a plurality of conductive polymer particles.

22. The method of claim 21, wherein the conductive polymer particles contain poly(3,4-ethylenedioxythiophene) or a derivative thereof.

23. The method of claim 21, wherein the conductive polymer particles also contain a polymeric counterion.

* * * * *